United States Patent Office.

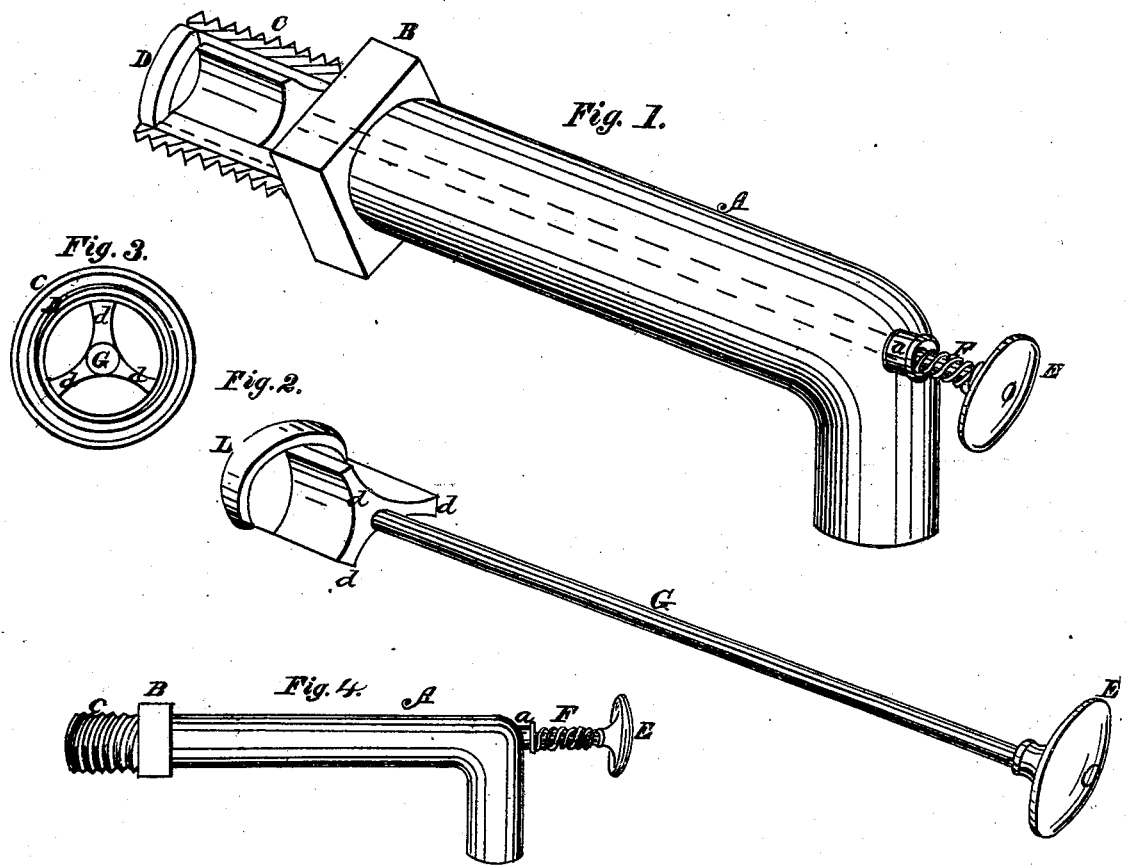

MARTIN ZIMMERMAN, OF EARL TOWNSHIP, PENNSYLVANIA.

Letters Patent No. 85,717, dated January 5, 1869.

IMPROVEMENT IN FAUCET.

The Schedule referred to in these Letters Patent and making part of the same.

*To all whom it may concern:*

Be it known that I, MARTIN ZIMMERMAN, of Earl township, in the county of Lancaster, and State of Pennsylvania, have invented a new and improved Piston-Faucet or Tap for drawing liquids; and I do hereby declare that the following is a full, clear, and exact description of the construction and operation of the same, reference being had to the accompanying drawings, making a part of this specification, in which—

Figure 1 is a perspective and plan view combined, to show the plunger or valve and rod within the pipe or faucet.

Figure 2 shows the piston-rod and valve or plug-connection detached.

Figure 3, a plan view or section of the valve, &c., of the same.

Figure 4, a profile view of the faucet, reduced in size.

The nature of my invention consists in providing a faucet, (that can be screwed into a cask or vessel,) having a square shoulder for the use of a wrench, and that will admit all the liquid entered into the pipe to be discharged, and by effectually closing the pipe at its inlet, operated by a spring-rod instead of a turning-cock.

To enable others skilled in the art to make and use my invention, it is only necessary to inspect the drawing, which clearly shows the cast-pipe A, with a stout angular band or flange for a wrench-hold, terminated by a screw-end, c, slightly tapering.

The end of the screw-tube c is bored out smooth, so that a plug, D, will fit air or water-tight into the same.

The front or outer end is bent, say, at a right angle, having a perforated collar, a, near the rounded angle, into which the piston-rod G enters, and extends to the rear of the tube, where it is firmly connected with the valve or plunger D, which latter fills up the bore of the pipe or cylinder.

This valve, plug, or plunger, is provided with the ridges d, hollowed out between them, as shown.

The rod G extends beyond the collar a, and is provided with a coiled spring, F, and knob, E.

The operation is readily understood, that by pushing the piston-rod back, the plug or plunger D will be released, and the liquid enter the pipe or faucet, and flow out in the ordinary manner.

The moment action on the knob or rod ceases, the pressure of the liquid and the action of the spring will close up the faucet, and allow the fluid to run off dry, leaving the faucet or pipe always empty; that is, the liquid will not remain in contact with the cylinder inside, like in the ordinary stop-cock. Until the same is opened, it shuts off all ingress to the faucet at once.

It is found much simpler, cheaper, more durable, and, for some purposes, more convenient than the turning-spigot, and has, upon a fair trial, proved itself of the greatest efficiency in sirups, as well as in the more volatile fluids.

I am aware that a rod with a simple plug on the end, operated by a knob and spring, is not new, with hooks on a clutch to keep the valve open, as in the patent, No. 17,433, in which is claimed a secondary chamber, or drip-passage, as also an annular groove in that part of the valve-stem which slides in a recess. Such an arrangement I disclaim, being too complicated and difficult to cast and fit up.

But I am not aware that a terminal valve on a rod, with longitudinal grooves, was ever employed, which, for its simplicity and efficiency, has been tested, being both cheap and desirable.

What I claim as my invention, and desire to secure by Letters Patent, is—

The elongated valve or plunger D, with its side-grooves and flanges d, operated on the end of a spring-rod within a simple faucet, A, provided with an angular flange, B, and screw-end, c, all arranged and operating in the manner and for the purpose specified.

MARTIN ZIMMERMAN.

Witnesses:
JOSIAH LANDIS,
JACOB STAUFFER.